United States Patent [19]

Slack

[11] Patent Number: 5,804,648
[45] Date of Patent: Sep. 8, 1998

[54] TOLUENE DIISOCYANATE RESIDUE-BASED COMPOSITIONS AND THE USE OF SUCH COMPOSITIONS AS FILLERS FOR HYDROXYL COMPOUNDS

[75] Inventor: William E. Slack, Moundsville, W. Va.

[73] Assignee: Bayer Corporation, Pittsburgh, Pa.

[21] Appl. No.: 777,315

[22] Filed: Dec. 27, 1996

[51] Int. Cl.$^6$ ............ C08K 5/205; C07C 269/02; C07C 271/28; C08G 18/48; C08G 18/40; C08G 18/42

[52] U.S. Cl. ............ 524/728; 252/182.24; 252/182.27; 252/182.28; 524/196; 524/198; 524/199; 524/366; 524/377; 524/762; 524/773; 525/452; 525/453; 525/454; 525/457; 525/458; 525/460; 528/49; 528/59; 528/67; 528/76; 528/77; 528/80; 528/81; 528/85; 560/24; 560/25; 560/26; 560/330; 560/336; 560/360

[58] Field of Search ............ 252/182.24, 182.27, 252/182.28; 524/196, 198, 199, 728, 366, 377, 762, 773; 525/452, 453, 454, 457, 458, 460; 528/49, 59, 67, 76, 77, 80, 81, 85; 560/24, 25, 26, 330, 336, 360

[56] References Cited

U.S. PATENT DOCUMENTS

| | | | |
|---|---|---|---|
| 2,884,362 | 4/1959 | Bloom et al. | 528/67 |
| 4,293,456 | 10/1981 | Reischl | 524/589 |
| 4,297,456 | 10/1981 | Reischl et al. | 525/452 |
| 4,480,081 | 10/1984 | Rosin et al. | 528/49 |
| 4,507,464 | 3/1985 | Rasshofer | 528/288 |
| 5,216,042 | 6/1993 | Daussin et al. | 521/160 |
| 5,290,818 | 3/1994 | Nafziger et al. | 521/54 |

*Primary Examiner*—Rabon Sergent
*Attorney, Agent, or Firm*—Joseph C. Gil; Lyndanne M. Whalen

[57] ABSTRACT

A TDI residue generated from the phosgenation of toluene diamine having an ortho-isomer content of less than 0.5% is used to produce a urethane-filled hydroxyl compound. The TDI residues useful in this invention must contain at least 10% monomeric TDI and have a total NCO content of at least 20%. These TDI residues are reacted with a monofunctional alcohol in an amount such that the equivalent ratio of isocyanate groups to hydroxyl groups is from about 0.9:1 to about 1:0.9. The resultant composition may then be dissolved in a polyhydroxyl compound to produce a urethane-filled polyhydroxyl compound. This urethane-filled polyhydroxyl compound may then be reacted with a polyisocyanate to produce a polyurethane.

26 Claims, No Drawings

TOLUENE DIISOCYANATE RESIDUE-BASED COMPOSITIONS AND THE USE OF SUCH COMPOSITIONS AS FILLERS FOR HYDROXYL COMPOUNDS

BACKGROUND OF THE INVENTION

The present invention relates to a toluene diisocyanate ("TDI") residue-based composition which is soluble in polyhydroxyl compounds, a process for the production of polyhydroxyl compounds filled with a TDI residue-based urethane and the products of this process and to polyurethanes produced from polyhydroxyl compounds filled with such TDI residue-based urethanes.

TDI is generally produced by phosgenating toluene diamine ("TDA"). In the course of producing TDI by this process, a non-distillable by-product which is commonly referred to as "TDI residue" or "TDI bottoms" is generated. The amount of this by-product generated during phosgenation is dependent upon the amount of ortho-toluene diamine ("o-TDA") present in the amine starting material and the phosgenation conditions. Major concerns in the production of TDI are, therefore, the amount of TDI residue generated and whether such TDI residue is useful in other applications.

The usefulness of a TDI residue is largely dependent upon the heat history of that residue. That is, the longer the residue has been subjected to high heat to remove monomeric TDI, the more difficult it becomes to work with that by-product. It has generally been found that after the TDI monomer content of the TDI residue has been reduced to a level below 10%, the remaining residue is a solid at ambient temperature and is insoluble in the commonly used solvents. Consequently, TDI residues containing less than 10% monomeric TDI are not generally considered useful and are disposed of by incineration.

The desirability of using the large quantities of TDI residue generated during TDI production is evident from the prior art.

U.S. Pat. No. 4,293,456, for example, teaches the use of finely ground solid TDI residue as a reactive filler which is substantially free of monomeric TDI (i.e., generally contains from 1 to 10% monomeric TDI) to produce polyurethane plastics. Previously unusable TDI residue is thus recycled and the mechanical properties of plastics made with that finely ground residue are improved. The TDI residue used in this process may be water quenched and denatured or chemically modified by reaction with carbonyl compounds, compounds reactive to isocyanate groups, or carbodiimide groups. The TDI residue must, however, be size reduced to less than 3 mm before it can be used.

U.S. Pat. No. 4,297,456 also teaches that TDI residue which is substantially free of monomeric TDI (i.e., contains less than 7.5% monomeric TDI) and insoluble in organic solvents may be used in the production of molded articles and elastomers if that TDI residue is first comminuted to a mean particle size of less than 800 mµ. This TDI residue may be modified during or after grinding by reaction with water, an amine, ammonia, a compound containing hydroxyl groups or a compound containing carboxyl groups.

U.S. Pat. No. 4,507,464 teaches that a liquid isocyanate residue may be obtained by phosgenating a primary polyamine such as TDA in the presence of a compound selected from a specified group and having at least one primary or secondary alcoholic hydroxyl group. The amine and hydroxyl-group containing compound are used in quantities such that the equivalent ratio of primary amino groups to hydroxyl groups is from 1:0.005 to 1:0.99 during the phosgenation. The residue remaining after the desired isocyanate prepolymer has been removed is a liquid.

U.S. Pat. No. 5,290,818 discloses a process for producing rebond foam in which the binder includes TDI distillation bottoms having a monomeric TDI content of from 20 to 30%.

It would be advantageous to develop a method for making TDI distillation residue sufficiently soluble in polyhydroxyl compounds that it could be made a liquid at ambient temperature without leaving economically impractical amounts of monomeric TDI in that residue.

SUMMARY OF THE INVENTION

It is an object of the present invention to provide a TDI residue-based composition which is soluble in polyhydroxyl compounds at ambient temperature.

It is also an object of the present invention to provide a method for producing liquid TDI residue-filled polyhydroxyl compounds.

It is another object of the present invention to provide a liquid, clear, urethane-filled hydroxyl compound which has been produced from TDI residue.

It is a further object of the present invention to provide a process for producing polyurethanes, particularly polyurethane foams, from a liquid, clear, urethane-filled polyhydroxyl compound that has been produced from TDI residue.

These and other objects which will be apparent to those skilled in the art are accomplished by selecting a TDI residue generated by phosgenation of TDA in which the o-TDA content was less than 0.5%. The TDI residue to be used in the present invention also contains at least 10% by weight monomeric TDI and has a total NCO content (i.e., the total NCO content of monomeric TDI and remaining residue) of at least 20%. TDI residue satisfying these criteria and a monofunctional alcohol are reacted in amounts such that the equivalent ratio of isocyanate groups to hydroxyl groups is from about 0.9:1.0 to about 1.0:0.9 to produce a urethane group-containing composition that is soluble in polyhydroxyl compounds at ambient temperature. This urethane group containing composition is then dissolved in a polyhydroxyl compound to produce a urethane-filled, polyhydroxyl composition. This urethane-filled polyhydroxyl composition may then be used to produce polyurethanes.

DETAILED DESCRIPTION OF THE INVENTION

The present invention relates to a process for generating a TDI residue-based composition which is soluble in polyhydroxyl compounds and to urethane-filled hydroxyl compositions made with such TDI residue-based compositions. In this process, a monofunctional alcohol and a TDI residue satisfying specific criteria are reacted in amounts such that the equivalent ratio of isocyanate groups to hydroxyl groups is from about 0.9:1 to about 1:0.9, preferably about 1:1.

The TDI residues useful in the practice of the present invention must satisfy the following criteria: (1) the residue must have been generated by the phosgenation of toluene diamine in which the o-TDA content was less than 0.5%, preferably less than 0.1%, most preferably about 0; (2) the monomeric TDI content of the TDI residue must be at least 10% by weight; and (3) the isocyanate group content of the TDI residue (i.e., total NCO content of monomeric TDI plus rest of residue) must be at least 20%.

With respect to the first of these criteria, the o-TDA content of the polyamine to be phosgenated may easily be determined by methods known to those skilled in the art such as gas chromatography. If the o-TDA content of the TDA is greater than 0.5%, the TDA may be treated (e.g., by fractional distillation) to reduce the level of o-TDA to an acceptable level.

The phosgenation of TDA may be carried out by any of the methods known to those skilled in the art. Upon completion of that phosgenation, monomeric TDI is generally removed from the reaction mixture by distillation. In accordance with the present invention, the reaction mixture may be distilled until up to 90% of the monomeric TDI has been removed. The remaining residue which contains at least 10% by weight monomeric TDI, preferably at least 15% but no more than 80% by weight monomeric TDI, and most preferably from about 20 to about 50% by weight monomeric TDI and which has a total NCO content (including the NCO content of the monomeric TDI) of at least 20%, preferably from about 24 to about 40%, most preferably from about 26 to about 34% is suitable as a starting material for the process of the present invention. It is preferred, but not required, that any solvent employed in the phosgenation process be removed prior to use of the TDI residue in accordance with the present invention.

Any of the known monofunctional alcohols (i.e., compounds containing one alcoholic hydroxyl group) may be reacted with the TDI residue satisfying the criteria of the present invention. Such monofunctional alcohols generally have a molecular weight of from about 32 to about 1,000, preferably from about 60 to about 400. Suitable monofunctional alcohols include compounds having a carbon backbone such as cetyl alcohol (16 carbons) as well as compounds which contain groups that will not react with isocyanate groups such as ether linkages, tertiary amines, chlorine, bromine, etc. Mixtures of such monofunctional alcohols may also be used.

Examples of suitable monofunctional alcohols include: dimethyl ethanolamine, methanol, ethanol, 1-propanol, 2-propanol, 1-butanol, 1-hexanol, 1-decanol, 1-octadecanol, cyclohexanol, 2-phenylethanol, 1-phenoxy-2-propanol, and alcohols extended with ethylene oxide and/or propylene oxide.

In addition to the monohydric alcohol, a polyhydroxyl compound may also be reacted with the TDI residue satisfying the criteria of the present invention. Any of the known polyhydroxyl compounds may be used, provided that the polyhydroxyl compound does not contribute more than 80% of the hydroxyl groups present in the mixture to be reacted with the TDI residue. Particularly suitable polyhydroxyl compounds include polyether polyols, polyester polyols and short chain diols.

Polyether polyols useful in the practice of the present invention typically have functionalities of from about 2 to about 6, preferably from about 2 to about 3, and molecular weights (number average determined by end group analysis) of from about 100 to about 6,000, preferably from about 150 to about 5,000. Examples of such polyether polyols include those obtained in known manner by reacting one or more starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides. Polyethers obtained by addition of ethylene oxide and/or propylene oxide are most preferred. Suitable starting compounds containing reactive hydrogen atoms include polyhydric alcohols (described below as being suitable for preparing polyester polyols); water; methanol; ethanol; 1,2,6-hexane triol; 1,2,4-butane triol; trimethylol ethane; pentaerythritol; mannitol; sorbitol; methyl glycoside; sucrose; phenol; isononyl phenol; resorcinol; hydroquinone; and 1,1,1- or 1,1,2-tris-(hydroxyl phenyl)-ethane.

Polyester polyols useful in the practice of the present invention typically have functionalities of about 2 and molecular weights (number average determined by end group analysis) of from about 200 to about 2,000, preferably from about 400 to about 1000. Examples of such polyester polyols include the reaction products of polyhydric alcohols (preferably dihydric alcohols to which trihydric alcohols may be added) and polybasic (preferably dibasic) carboxylic acids. In addition to these polycarboxylic acids, corresponding carboxylic acid anhydrides or polycarboxylic acid esters of lower alcohols or mixtures thereof may also be used to prepare the polyester polyols useful in the practice of the present invention. The polycarboxylic acids may be aliphatic, cycloaliphatic, aromatic and/or heterocyclic and they may be substituted, e.g. by halogen atoms, and/or unsaturated. Examples of suitable polycarboxylic acids include: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include: ethylene glycol; 1,2- and 1,3-propylene glycol; 1,3- and 1,4-butylene glycol; 1,6-hexanediol; 1,8- octanediol; neopentyl glycol; cyclohexanedimethanol; (1,4-bis(hydroxymethyl) cyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol, glycerine and trimethylolpropane. The polyesters may also contain a portion of carboxyl end groups. Polyesters of lactones, e.g. -caprolactone or hydroxyl carboxylic acids such as ω-hydroxycaproic acid, may also be used.

Short chain diols useful in the practice of the present invention typically have molecular weights of from about 62 to about 400. Examples of suitable diols include: 1,3-butanediol, 1,2-propylene glycol, ethylene glycol, and N-methyl-diethanolamine.

The TDI residue satisfying the criteria of the present invention, a monofunctional alcohol and any optional polyol are reacted in amounts such that the equivalent ratio of isocyanate groups to hydroxyl groups is from about 0.9:1 to about 1:0.9, preferably about 1:1. This reaction may be carried out at temperatures of from about 40 to about 120° C., preferably from about 70 to about 100° C. at atmospheric pressure.

The reaction product is a urethane group containing TDI residue-based composition which is solid at ambient temperature but which is soluble in polyhydroxyl compounds and in most of the commonly used organic solvents (e.g., toluene, methylene chloride and tetrahydrofuran) at ambient temperature. This reaction product may then be dissolved in a polyhydroxyl compound to produce a urethane-filled TDI residue-based polyhydroxyl composition. This polyhydroxyl composition in which the TDI residue derived urethane group-containing composition may be dissolved may be a polyether polyol, a polyester polyol, or a short-chain diol. Suitable polyether polyols, polyester polyols and short-chain diols correspond to those described above as being suitable optional reactants which may be used in combination with the monofunctional alcohol.

If the urethane-containing TDI residue-based composition to be dissolved does not contain any ether linkages and that composition is to be dissolved in a polyether polyol, the polyether polyol solvent must contain at least 5% by weight ethylene oxide if it is to be effectively dissolved.

The amount of polyhydroxyl compound in which the TDI residue-based composition is dissolved is generally determined on the basis of handling and processing considerations (e.g., viscosity). For most applications, however, the amount of polyhydroxyl compound used is selected so that the dissolved urethane-group containing TDI residue-based composition will be present in a quantity of from about 10 to about 50% by weight .

The TDI residue-based urethane filled polyhydroxyl composition of the present invention thus produced are particularly useful for the production of polyurethanes, particularly polyurethane foams. The urethane filled polyhydroxyl compositions of the present invention may be reacted with any of the known and commercially available isocyanates by any of the known methods for producing polyurethanes.

Isocyanates which may be reacted with the urethane filled polyhydroxyl compositions of the present invention include aliphatic, cycloaliphatic, araliphatic, aromatic and heterocyclic isocyanates, modified isocyanates and isocyanate-terminated prepolymers. Examples of such isocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclohexane diisocyanate, hexahydrotoluene diisocyanate and its isomers, isophorone diisocyanate, dicyclohexylmethane diisocyanates, 1,5-naphthalene diisocyanate, 1-methylphenyl-2,4-phenyl diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyl-4,4'-biphenylene diisocyanate; triisocyanates such as 2,4,6-toluene triisocyanate; and polyisocyanates such as 4,4'-dimethyl-diphenylmethane-2,2',5,5'-tetraisocyanate and the polymethylene polyphenylpolyisocyanates.

Modified isocyanates are obtained by chemical reaction of diisocyanates and/or polyisocyanates. Modified isocyanates useful in the practice of the present invention include isocyanates containing ester groups, urea groups, biuret groups, allophanate groups, carbodiimide groups, isocyanurate groups, uretdione groups and/or urethane groups. Preferred examples of modified isocyanates include prepolymers containing NCO groups and having an NCO content of from about 25 to about 35% by weight, preferably from about 28 to about 32% by weight. Prepolymers based on polyether polyols or polyester polyols and diphenylmethane diisocyanate are particularly preferred. Processes for the production of these prepolymers are known in the art.

The most preferred polyisocyanates for the production of rigid polyurethanes are methylene-bridged polyphenyl polyisocyanates and prepolymers of methylene-bridged polyphenyl polyisocyanates having an average functionality of from about 1.8 to about 3.5 (preferably from about 2.0 to about 3.1) isocyanate moieties per molecule and an NCO content of from about 25 to about 35% by weight, due to their ability to crosslink the polyurethane.

Catalysts and solvents may be used to aid the polyurethane-forming reaction. Examples of catalysts useful for promoting urethane reactions include di-n-butyl tin dichloride, di-n-butyl tin diacetate, di-n-butyl tin dilaurate, triethylenediamine, bismuth nitrate. Examples of the useful solvents include: toluene, tetrahydrofuran, chlorobenzene.

Having thus described my invention, the following Examples are given as being illustrative thereof. All parts and percentages given in these Examples are parts by weight and percentages by weight, unless otherwise indicated.

EXAMPLES

The materials used in the Examples which follow were:

Alcohol A: a 1-butanol started propylene oxide adduct having a molecular weight of 315 and a functionality of 1.

Alcohol B: 1-butanol.

Alcohol C: 2-ethyl-1-hexanol.

PG: 1,2-propylene glycol.

TEG: triethylene glycol.

TPG: tripropylene glycol.

Polyol A: a propylene glycol/propylene oxide adduct having a functionality of 2 and a molecular weight of 2000.

Polyol B: a glycerine/propylene oxide/ethylene oxide adduct having 17% terminal ethylene oxide, a functionality of 3 and a molecular weight of 4800.

Polyol C: a propylene glycol/propylene oxide/ethylene oxide adduct having 20% terminal ethylene oxide, a functionality of 2 and a molecular weight of 4000.

Polyol D: an aromatic polyester prepared from phthalic anhydride and diethylene glycol having a functionality of 2 and a molecular weight of 470 which is commercially available from Stepan Company under the name Stepanpol PS-2352.

Polyol E: a polyester prepared from adipic acid, ethylene glycol and 1,4-butanediol having a functionality of 2 and a molecular weight of 2000.

TDI I: TDI residue generated by phosgenating TDA containing 80% 2,4-TDA and 20% 2,6-TDA and no o-TDA. The monomeric TDI content was 27.2%, the percent by weight residue was 72.8%, and the total NCO content was 27.8%.

TDI II: TDI residue generated by phosgenating TDA containing 80% 2,4-TDA, 20% 2,6-TDA and no o-TDA. The monomeric TDI content was 38%, the percent by weight residue was 62%, and the total NCO content was 32.4%.

TDI III: TDI residue generated by phosgenating TDA containing 80% 2,4-TDA, 20% 2,6-TDA and no o-TDA. The monomeric TDI content was 25.9%, the percent by weight residue was 74.1% and the NCO content was 29.5%.

The procedure used in each of the Examples was as follows:

TDI RESIDUE was introduced into a 500 ml 3-necked flask equipped with a stirrer and thermometer in the amount indicated in the Table. The TDI RESIDUE was stirred and to this stirred TDI RESIDUE was introduced the monofunctional alcohol and any optional polyol at 25° C. in the amount(s) indicated in the Table. The resultant mixture was allowed to exotherm to 90° C. and then held at 90° C. until no NCO groups remained. The contents of the flask were then dissolved in the polyhydroxyl compound indicated in the Table which follows.

TABLE

| Example | TDI RESIDUE | Mono-alcohol | Polyol | % Urethane Polyol | Viscosity mPa·s (25° C.) | Appearance |
|---|---|---|---|---|---|---|
| 1 | TDI I 125 g | Alcohol A 261 g | Polyol A | 25% | 858 | Clear |
| 2 | TDI I 125 g | Alcohol A 261 g | Polyol B | 25% | 2850 | Clear |
| 3 | TDI I 100 g | Alcohol B 49 g | PG | 50% | 350 | Clear |
| 4 | TDI I 100 g | Alcohol B 49 g | TEG | 25% | 108 | Clear |
| 5 | TDI I 100 g | Alcohol B 49 g | TEG | 50% | 400 | Clear |
| 6 | TDI I 100 g | Alcohol B 49 g | TPG | 25% | 160 | Clear |
| 7 | TDI I 100 g | Alcohol B 49 g | TPG | 50% | 840 | Clear |
| 8 | TDI II 50 g | Alcohol C 50 g | Polyol D | 40% | 134,400 | Clear |
| 9 | TDI II 54 g | Alcohol B 31 g | Polyol D | 28% | 9800 | Clear |
| 10 | TDI I 125 g | Alcohol A 195 g/ TPG 20 g | Polyol A | 20% | 800 | Clear |
| 11 | TDI I 125 g | Alcohol A 195 g/ TPG 20 g | Polyol B | 20% | 1956 | Clear |
| 12 | TDI I 125 g | Alcohol A 195 g/ TPG 20 g | Polyol C | 20% | 1860 | Clear |
| 13 | TDI I 125 g | Alcohol A 130 g/ TPG 40 g | Polyol B | 20% | 5030 | Clear |
| 14 | TDI I 125 g | Alcohol A 130 g/ TPG 40 g | Polyol C | 10% | 3240 | Clear |
| 15 | TDI III 100 g | Alcohol B 44 g/ Polyol A 66 g | Polyol B | 23% | 4030 | Clear |
| 16 | TDI III 100 g | Alcohol B 44 g/ Polyol A 66 g | Polyol A | 22% | 1240 | Clear |
| 17 | TDI III 93 g | Alcohol B 23 g/ Polyol A 308 g | Polyol B | 25% | 1912 | Clear |
| 18 | TDI III 93 g | Alcohol B 23 g/ Polyol A 308 g | Polyol A | 29% | 918 | Clear |
| 19 | TDI II 55 g | Alcohol B 31 g | Polyol E | 25% | 21,600 | Clear |
| 20 | TDI II 55 g | Alcohol B 31 g | Polyol E | 33% | 29,500 | Clear |
| 21 | TDI II 55 g | Alcohol B 31 g | Polyol E | 50% | 85,600 | Clear |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed:

1. A process for the production of a urethane group containing TDI residue based composition which is solid at ambient temperature, comprising reacting a) a toluene diisocyanate residue containing at least 10% by weight monomeric toluene diisocyanate and having a total isocyanate group content of at least 20% which residue was generated by phosgenating toluene diamine having an ortho-toluene diamine content of less than 0.5% with b) a monofunctional alcohol in amounts such that the equivalent ratio of isocyanate groups in a) to hydroxyl groups in b) is from about 0.9:1.0 to 1.0:0.9.

2. The process of claim 1 in which a polyhydroxyl compound is present during the reaction in an amount such that at least 20% of the total hydroxyl groups present are hydroxyl groups from the mono-functional alcohol.

3. The process of claim 1 in which the monofunctional alcohol has a molecular weight of from about 32 about 1000.

4. The process of claim 1 in which the monofunctional alcohol has a molecular weight of from about 60 to about 400.

5. The process of claim 1 in which the toluene diisocyanate residue has a total isocyanate group content of at least 25%.

6. The process of claim 1 in which the toluene diisocyanate residue is produced by phosgenation of toluene diamine having an ortho-isomer content of less than 0.1%.

7. The product of the process of claim 6.

8. The product of the process of claim 1.

9. The product of the process of claim 2.

10. A process for the production of a urethane-filled hydroxyl compound comprising dissolving the product of claim 7 in a polyhydroxyl compound.

11. A process for the production of a urethane-filled hydroxyl compound comprising dissolving the product of claim 8 in a polyhydroxyl compound.

12. A process for the production of a urethane-filled hydroxyl compound comprising dissolving the product of claim 9 in a polyhydroxyl compound.

13. The process of claim 11 in which the polyhydroxyl compound is a polyether polyol.

14. The process of claim 13 in which the polyether polyol has a molecular weight of from about 100 to about 6,000.

15. The process of claim 13 in which the polyether polyol has a functionality of from about 2 to about 6.

16. The process of claim 13 in which the polyether polyol has a functionality of from about 2 to about 3.

17. The process of claim 13 in which the polyether polyol has a molecular weight of from about 150 to about 5000.

18. The process of claim 11 in which the polyhydroxyl compound is a polyester polyol.

19. The process of claim 18 in which the polyester polyol has a functionality of about 2.

20. The process of claim 18 in which the polyester polyol has a molecular weight of from about 200 to about 2000.

21. The clear, urethane-filled hydroxyl compound produced by the process of claim 11.

22. The clear, urethane-filled hydroxyl compound produced by the process of claim 13.

23. The clear, urethane-filled hydroxyl compound produced by the process of claim 18.

24. A polyurethane produced by reacting the hydroxyl compound of claim 21 with a polyisocyanate.

25. A polyurethane produced by reacting the hydroxyl compound of claim 22 with a polyisocyanate.

26. A polyurethane produced by reacting the hydroxyl compound of claim 23 with a polyisocyanate.

* * * * *